(12) United States Patent
Bedetti et al.

(10) Patent No.: US 10,267,672 B2
(45) Date of Patent: Apr. 23, 2019

(54) THIN WEIGHING SCALE USING ULTRASONIC WAVES AND METHOD USING SAME

(71) Applicant: WITHINGS, Issy les Moulineaux (FR)

(72) Inventors: Thomas Bedetti, Paris (FR); Arthur Meyre, Paris (FR); Nadine Buard, Meudon (FR); Cédric Hutchings, Sunnyvale, CA (US)

(73) Assignee: WITHINGS, Issy les Moulineaux (FR)

( * ) Notice: Subject to any disclaimer, the term of this patent is extended or adjusted under 35 U.S.C. 154(b) by 132 days.

(21) Appl. No.: 15/393,934

(22) Filed: Dec. 29, 2016

(65) Prior Publication Data

US 2018/0188103 A1 Jul. 5, 2018

(51) Int. Cl.

| | |
|---|---|
| *G01G 19/44* | (2006.01) |
| *G01G 3/13* | (2006.01) |
| *G01G 21/22* | (2006.01) |
| *G01G 3/16* | (2006.01) |
| *G01G 9/00* | (2006.01) |

(52) U.S. Cl.
CPC ............... *G01G 19/44* (2013.01); *G01G 3/13* (2013.01); *G01G 3/16* (2013.01); *G01G 9/00* (2013.01); *G01G 21/22* (2013.01)

(58) Field of Classification Search
CPC ........... G01G 19/44; G01G 9/00; G01G 21/22
See application file for complete search history.

(56) References Cited

U.S. PATENT DOCUMENTS

| | | | | |
|---|---|---|---|---|
| 3,428,139 | A * | 2/1969 | Nolan | B60G 17/01933 177/137 |
| 3,508,623 | A * | 4/1970 | Greenstein | G01G 9/00 177/137 |
| 4,503,922 | A * | 3/1985 | Brosh | G01G 3/14 177/210 EM |
| 9,759,599 | B2 * | 9/2017 | Bedetti | G01G 19/44 |
| 2006/0108153 | A1 * | 5/2006 | Munz | G01G 9/00 177/136 |
| 2010/0133016 | A1 * | 6/2010 | Mannhart | G01G 7/00 177/25.12 |
| 2013/0277122 | A1 * | 10/2013 | Ischdonat | G01G 17/02 177/1 |

(Continued)

OTHER PUBLICATIONS

International Search Report related to Application No. PCT/EP2017/084598 reported on Apr. 9, 2018.

(Continued)

*Primary Examiner* — Natalie Huls
(74) *Attorney, Agent, or Firm* — Miller, Matthias & Hull LLP

(57) ABSTRACT

A weighing device, configured to measure at least the weight of a person or an object, comprising a control unit, a sensory plate, a top plate, spacer pads, interposed between the plates, wherein the sensory plate has an emission transducer configured to generate, a burst of Lamb waves at the surface of the sensory plate, a reception transducer, to receive echoed Lamb waves propagated through the sensory plate, the temporal profile of the echoed Lamb waves being dependent on the weight applied to the top plate and passed by the spacer pads to the sensory plate, wherein the control unit determines the weight applied to the top plate by analysis of the temporal profile of the echoed Lamb waves.

18 Claims, 4 Drawing Sheets

(56) References Cited

U.S. PATENT DOCUMENTS

| | | | | |
|---|---|---|---|---|
| 2013/0310700 A1* | 11/2013 | Wiard | ............... | A61B 5/02125 |
| | | | | 600/485 |
| 2016/0002004 A1* | 1/2016 | Tan | ...................... | B66B 1/3476 |
| | | | | 702/173 |
| 2016/0363475 A1* | 12/2016 | Bedetti | ................. | G01G 19/44 |

OTHER PUBLICATIONS

Singapore 639798 et al: "Detecting and Monitoring of Stress on Beams Using Lamb Waves", Re-engineering Manufacturing for Sustainability: Proceedings of the 20$^{th}$ CIRP International Conference on Life Cycle Engineering Singapore Apr. 17-19, 2013.

* cited by examiner

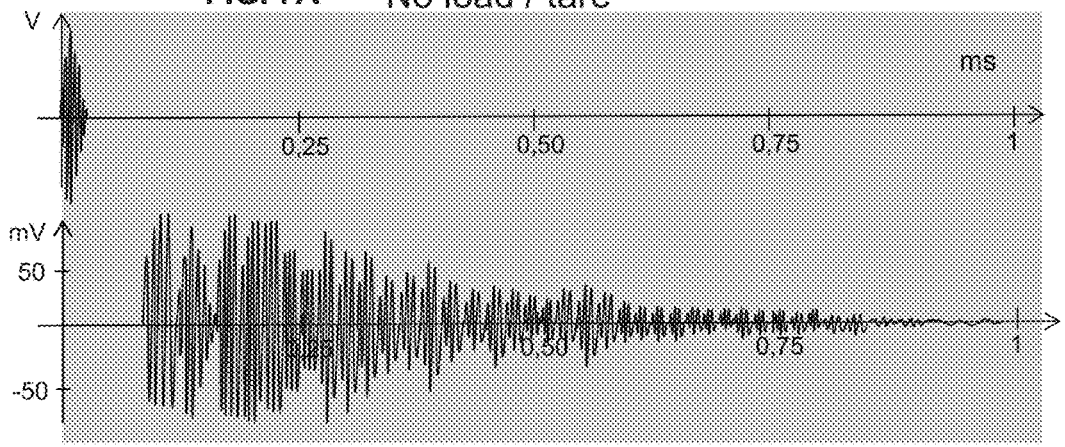
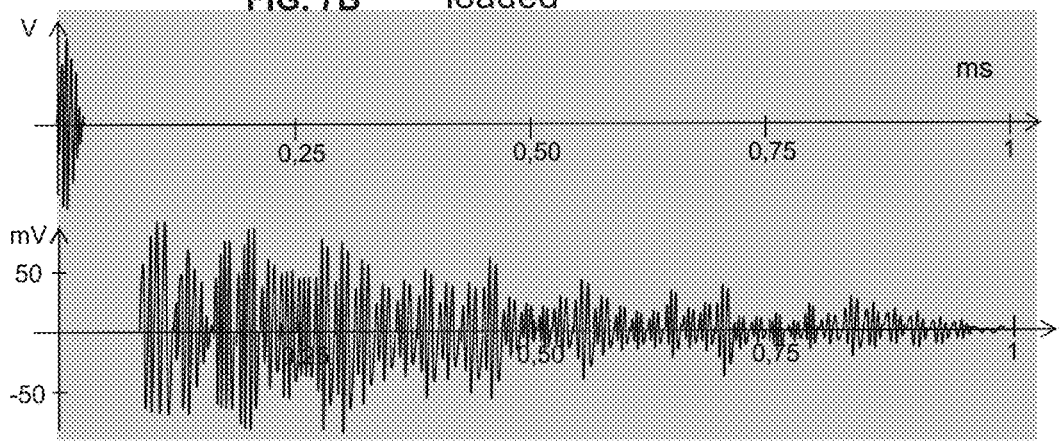
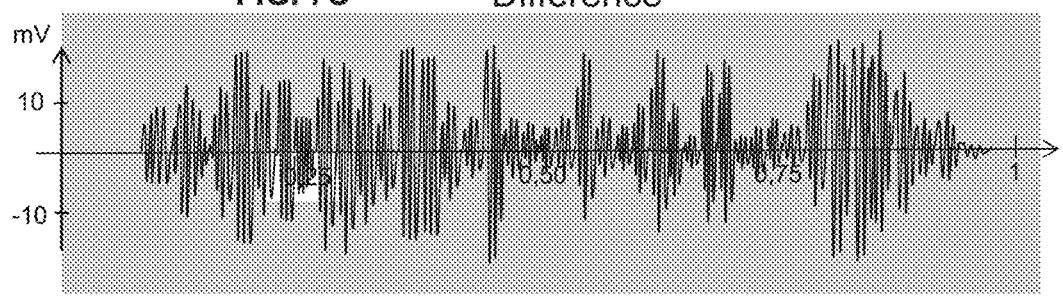

THIN WEIGHING SCALE USING ULTRASONIC WAVES AND METHOD USING SAME

FIELD OF THE DISCLOSURE

The present invention relates to thin weighing devices and notably weighing scales, and more particularly the so-called bathroom electronic scales.

BACKGROUND OF THE DISCLOSURE

There is a constant trend to try to decrease the thickness of electronic scales. In the prior art, the electronic scales are provided with four feet bearing on the floor, tiles, carpet, etc. Each foot houses a load cell. One example of such configuration is given by document U.S. Pat. No. 4,800,973.

There is also a constant trend to try to decrease the cost of such electronic scales.

One problem arises when the overall thickness of the scale is decreased, because the height of the feet (i.e. clearance) is not large enough in case the scale is lying on a rather deep carpet, like in a bedroom fitted carpet, or on an uneven floor. If the underbody of the scale touches the floor, this results in an inaccurate, even substantially wrong, weight measurement.

Therefore, some attempts have been done to provide a so-called "sandwich structure" with a rigid top plate, a rigid bottom plate and load cells interposed therebetween. The structure taught by US20100133016 exhibits shortcomings because the top plate may rub against the bottom plate which causes inaccurate weight measurement. Mechanical guidance is quite tricky to make proper use of load cells.

Therefore it remains a need to propose a weighing scale which exhibits a thickness of less than 20 mm, and which exhibits a simplified mechanical configuration.

SUMMARY OF THE DISCLOSURE

To this aim, there is disclosed a weighing device configured to measure at least the weight of a person or an object, comprising:
  a control unit (3),
  a sensory plate (1),
  a top plate (2), arranged parallel and at distance from the sensory plate, with no direct contact with sensory plate,
  a plurality of spacer pads (9), interposed between the sensory plate and the top plate,
  isolator feet (8) under the sensory plate,
  wherein the sensory plate is fitted with at least an emission transducer (11,Tx) configured to generate, on a periodic basis, a burst of Lamb waves (6) at the surface of the sensory plate,
  and wherein the sensory plate is fitted with at least a reception transducer (12;13,14), configured to receive echoed Lamb waves (7) propagated through the sensory plate, the temporal profile of the echoed Lamb waves being dependent on the weight (P) applied to the top plate and passed by the spacer pads to the sensory plate,
  wherein the control unit determines the weight applied to the top plate by analysis of the temporal profile of the echoed Lamb waves.

This results in a very simple and cost effective mechanical configuration. No load cell is required; a very thin weighing device can thus be designed.

The comparison is preferably made at least with regard to reference echoed Lamb waves profile(s) obtained with no load on the scale and/or with calibrated weights.

Additionally, one or several of the following features can be used in combination.

The number of spacer pads is chosen between either four spacer pads, nine spacer pads, or sixteen spacer pads, in a generally square configuration. This is a straightforward and balanced configuration.

Each spacer may be substantially square shaped with a thickness of less than 2 mm. This contributes to provide a very thin weighing device.

The thickness of the weighing scale is less than 18 mm, preferably less than 15 mm. This turns out to be amazingly thin if compared to prior art.

The top plate is rigid and may be made of glass. This is good looking and thanks to non conductive properties, this allows impedance measurement, with pads of tin oxide coating deposited on the top surface.

The sensory plate is rigid and may be made of glass. This material exhibits good propagation properties for Lamb waves.

There may be only one reception transducer (12). This provides good cost effectiveness.

There may be two or more emission transducers (11). This provides improved accuracy.

There are two or more reception transducers. This also provides improved accuracy.

The device may further comprise a display and the reception transducers may be distributed on left side and right side, and an off-center condition is detected and indicated on the display. This provides a user friendly function to ease good stance on scale.

Weight measures may be performed repeatedly to output a successive series of weight values and a ballistography analysis is performed on the successive series of weight values. Heart rate can advantageously be inferred therefrom.

The generated burst of ultrasonic Lamb waves may be comprised within the ultrasonic frequency range of [400 kHz-550 kHz]. This represents an optimum for Lamb waves propagation on such plate; center frequency may be about 480 kHz.

There may be only one emission transducer and one reception transducer, the two latter formed by a single transducer used sequentially in emission mode and then in reception mode. This provides a still better cost effectiveness.

The present invention is also directed to a method, namely a method carried out in a weighing device comprising a control unit (3), a sensory plate (1) fitted with at least a emission transducer (11,Tx) and at least a reception transducer (12;13,14), a top plate (2), a plurality of spacer pads (9) interposed between the sensory plate and the top plate, the method comprising the steps:
  c1—cause a person or objet to bear on the top plate,
  c2—generate emission of a Lamb waves burst (6) at the emission transducer (11,Tx) which causes Lamb waves to propagate through the sensory plate,
  c3—receive echoed Lamb waves (7) at the reception transducer, an determine a first echoed Lamb waves profile,
  c4—compare the temporal profile of the first echoed Lamb waves, with regard to a base reference echoed Lamb waves profile, by difference calculation to obtain a differentiated wave profile,
  c5— determine therefrom the weight of the person or objet bearing on the top plate,
    display and/or send a resulting weight value.

This method is advantageously carried out in a scale with a very simple, very thin and cost effective mechanical configuration.

Additionally, one or several of the following method features can be used in combination.

The method may further comprise:

a1—provide a tare configuration with no load on the scale, a2—generate emission of a Lamb waves burst at the emission transducer (11,Tx) which causes Lamb waves to propagate through the sensory plate, a3—receive echoed Lamb waves (7) at the reception transducer, and determine a reference tare echoed Lamb waves profile, the base reference echoed Lamb waves profile is determined according to the reference tare echoed Lamb waves profile. The null load reference can therefore be updated and slow drifts with ageing can advantageously be compensated for.

The method may further comprise:

b1—cause a calibrated weight to lie on the top plate, b2—generate emission of a Lamb waves burst at the emission transducer (11,Tx) which causes Lamb waves to propagate through the sensory plate, b3—receive echoed Lamb waves (7) at the reception transducer, and determine a reference echoed Lamb waves profile, b4—compare the temporal profile of the echoed Lamb waves, with reference tare echoed Lamb waves profile, b5—determine a weight correction and/or allocate a set of parameters to be applied to subsequent weight measurement. This provides a still better accuracy.

A set of calibration weight may be used to perform steps b1 to b5 several times in order to adjust individual calibration parameters. This provides a still better accuracy and compensate for non linearities.

There are provided two or more reception transducers distributed on left side and right side, the method comprising the steps:

detecting an off-center condition indicating an off-center condition on the display.

This provides a user friendly function to ease good stance on scale.

DETAILED DESCRIPTION OF THE DRAWINGS

Other characteristics and advantages of the invention will readily appear from the following description of some of its embodiments, provided as a non-limitative examples, and of the accompanying drawings.

On the drawings:

FIG. 7A is an exemplary timechart of operation;

Figure 8:
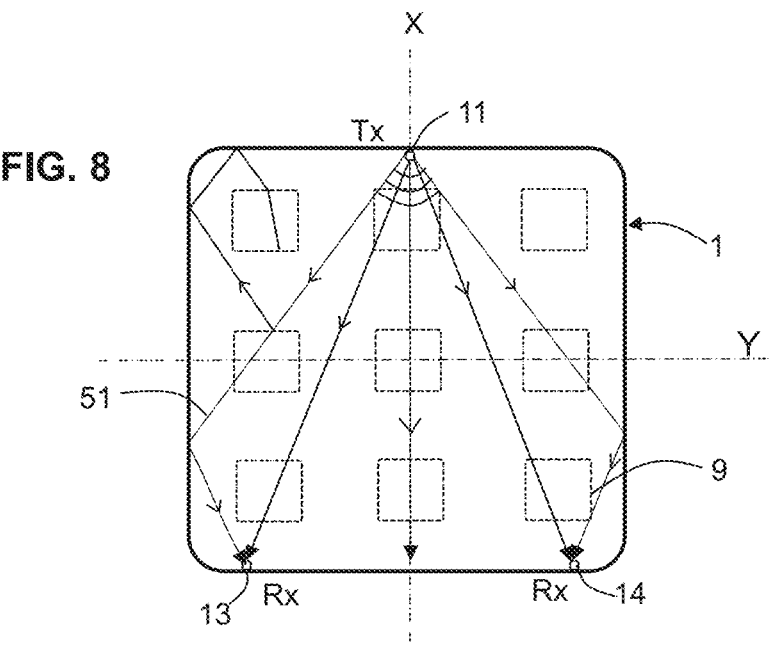
Figure 9:
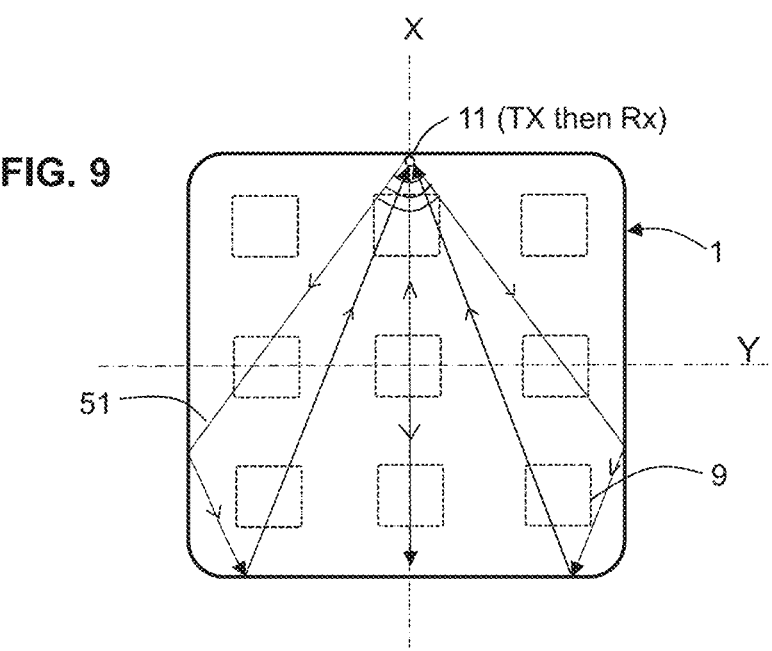

FIG. 7B 7C are another exemplary timecharts of operation;

FIG. 8 shows another embodiment of a weighing scale according to the present invention, with several reception transducers, FIG. 9 shows still another embodiment of a weighing scale according to the present invention with a single transducer.

On the different Figures, the same reference signs designate like or similar elements.

DETAILED DESCRIPTION OF THE DISCLOSURE

Figure 1:
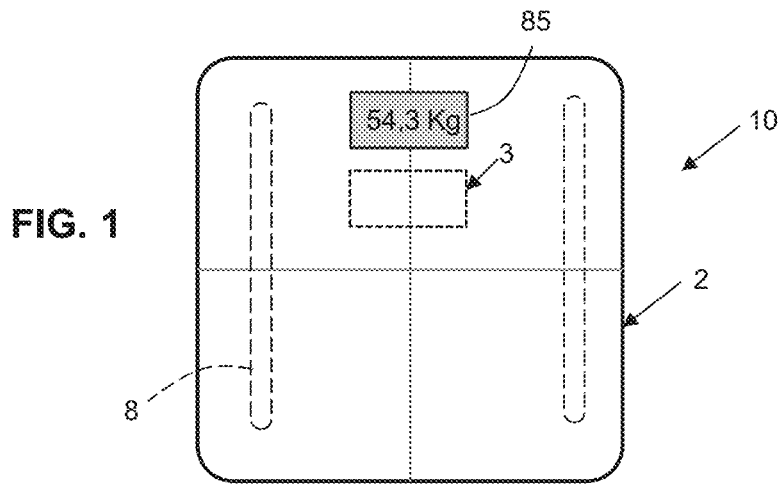
FIG. 1 is a top view of a weighing scale according to the present invention.
Figure 2:
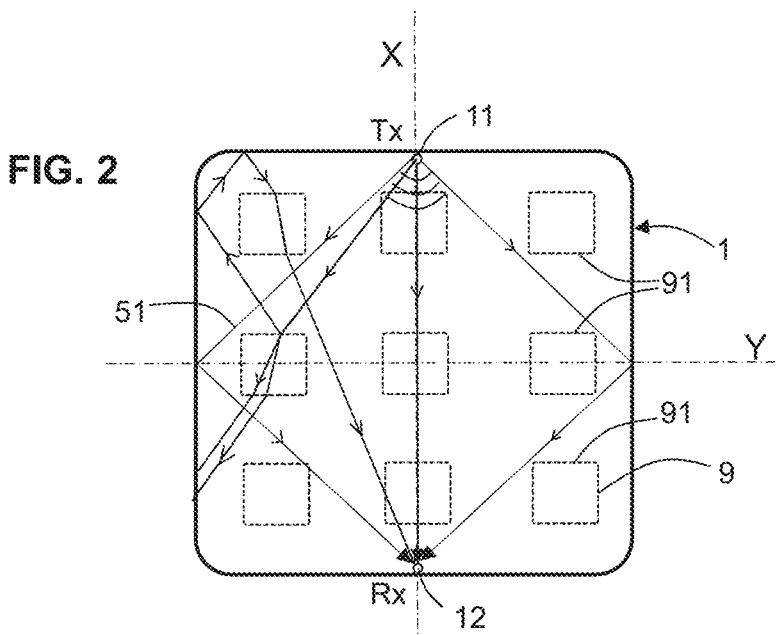
FIG. 2 is a diagrammatic view top sectional view of the weighing scale of FIG. 1.
Figure 3:
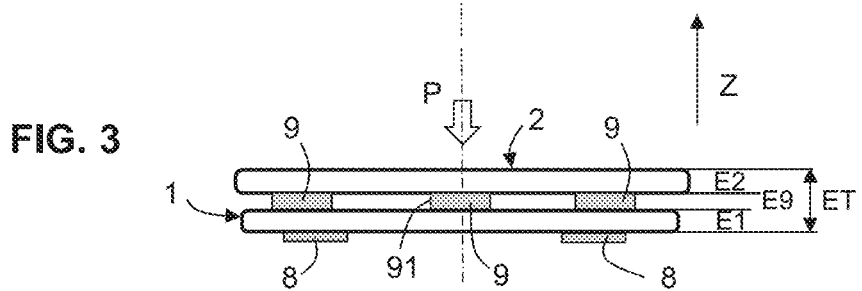
FIG. 3 shows an elevation schematic view of the device of FIG. 1; proportions of the device (especially in the Z-direction are exaggerated for clarity purposes)

A personal weighing scale 10 according to the present invention is shown at FIGS. 1-3. This scale is designed to measure weights in the range between 10-300 kg, and the ideal resolution is obtained within the range between 30-200 kg. It is also known as 'bathroom' scale although it can be used in a bedroom or in another room of a house. As it will be seen, it can advantageously be used on carpet floors, even deep carpet floor, and also on uneven floor.

The scale comprises a display 85 and a control unit 3.

The scale comprises a bottom plate 1 which is a rigid plate. The bottom plate 1 extends generally in a horizontal plane XY, defined by a first direction X and a second direction Y. Material of the bottom plate 1 is selected from glass, metal, alloys, fiberglass, hard plastic, or any other suitable material. The bottom plate 1 has a generally rectangular shape, with side length comprised 25 cm and 35 cm with rounded corners. The bottom plate 1 exhibits a substantially constant thickness E1 over most of its area, this thickness E1 is typically comprised 3 mm and 5 mm.

The bottom plate 1 is called 'sensory plate' 1 in the following description.

There are provided isolator feet 8 provided under the sensory plate 1 to decouple vibrations occurring in the sensory plate 1 (as will be seen later) from the ground, additionally an anti-slip surface may be provided at the bottom of isolator feet 8. There may be either four isolator feet or two isolator feet formed as elongated beads extending substantially on a major portion of the length of the plate in the X direction.

The scale includes a top plate 2 adapted with its shape and size for an object to be weighed. The scale is especially adapted for a personal use as a bathroom scale. The top plate 2 of the scale thus may have a flat upper surface, so that a user may conveniently stand on the scale. The upper surface of the top plate 2 could also be textured, so that it may roughly delineate contours of human feet, and/or the upper surface of the top plate 2 may be coated with a non-slippery material such as rubber or the like. Material of the top plate 2 is preferably glass but metal, plastic, or other suitable material might be considered. The bottom plate 1 has a generally rectangular shape, with side length comprised 25 cm and 35 cm with rounded corners. The top plate 2 exhibits a substantially constant thickness E2 over most of its area, this thickness E2 is comprised 3 mm and 5 mm.

There are provided a plurality of spacer pads 9, interposed between the sensory plate and the top plate.

Preferably, the clearance distance between the top plate 2 and the sensory plate 1 is typically comprised between 3 mm and 5 mm.

Preferably, spacer pads 9 are made of strong material, like a metallic alloy, more preferably made from aluminium. Other synthetic material like polyamide, polyvinyle, polyethylene, polycarbonate, or the like can also be used.

The thickness E9 of spacer pads 9 is typically comprised between 1 mm and 3 mm, preferably around 2 mm.

Preferably, there is no other mechanical interface between the sensory plate and the top plate, other than the spacer pads 9.

The above described structure, although illustrated for a scale, can be used for a weighing device of different type, like a vehicle weighing device, a food weighing device, a letter weighing device or any other type of weighing device.

Total thickness ET of the scale can be as small as less than 15 mm. Generally, thickness ET of the scale is less than 18 mm.

In the illustrated example, the sensory plate 1 is equipped with one emission transducer 11. This emission transducer 11 is typically a piezoelectric actuator.

Note that the piezo electric transducers used here are very thin, their thickness is less than 1 mm, typically about 0.3 mm.

This emission transducer 11 is configured to generate a burst of Lamb waves (denoted 6 at FIG. 4) at the surface of the sensory plate 1. This emission is repeated on a periodic basis (see FIG. 5). Repetition frequency F6 can be comprised between 200 Hz and 1 kHz.

For one illustrative example of sensory plate made of glass, spectrum of the generated burst 6 is comprised within the ultrasonic frequency range of [400 kHz-550 kHz]. Preferably, it is centered on 480 kHz.

From sensory plate made from other material, the range and centering of the frequency range can be different. Frequency range can be [80 kHz-800 kHz]; Frequency range can be [10 kHz-250 kHz]; Frequency range can be [200 kHz-450 kHz]; Frequency range can be [500 kHz-650 kHz].

The generated burst 6 exhibits typically a time duration comprised between 2 microseconds and 20 microseconds.

In the illustrated example of FIG. 1-3, the sensory plate 1 is equipped with one reception transducer 12, configured to receive echoed Lamb waves propagated through the sensory plate.

Figure 4:
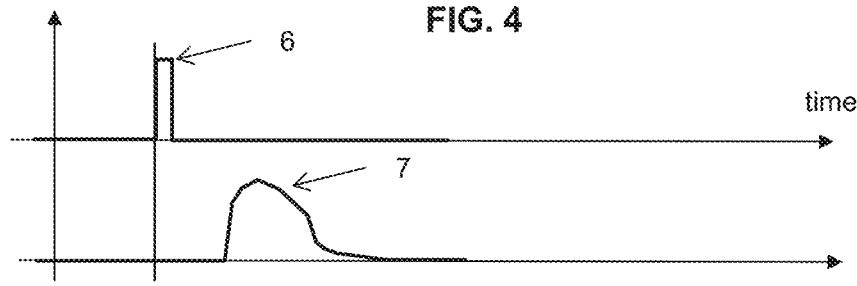
FIG. 4 is a diagrammatic timechart of the basic principle of operation.

As illustrated on FIG. 4, the temporal profile of the echoed Lamb waves 7 is delayed with regard to the incident burst 6. Incident waves starting from the emission point 11 propagate and reflect on side surfaces; they also reflect and/or refract on the delimitation lines 91 of the spacer pads, as shown on FIG. 2. Illustrative path denoted 51 is only a partial representation of a multitude of paths.

The temporal profile is dependent on the weight (P) applied to the top plate 2; such weight is passed by the spacer pads 9 to the sensory plate 1.

The pressure applied on the spacer affects the behaviour regarding the refraction and transmission of ultrasonic waves.

The refraction and diffraction angles at the delimitation lines 91 of the spacer pads are dependent on the load applied to the spacer pads. Therefore, the temporal profile of the echoed Lamb waves 7 depends on the load applied to the spacer pads.

It should be noted that the temporal profile may not behave linearly with the load applied.

The inventors have discovered that this phenomenon can be amazingly leveraged to get the applied weight to be assessed.

The inventors have found that the Lamb waves reflect and/or refract on the delimitation lines 91 of the spacer pads in a similar manner than optical waves.

Generally speaking, the stronger the load applied, the longer is the delay of some Lamb waves due to the reflection and/or refraction. Therefore, the temporal distribution of received energy is dependent on the load applied. Said otherwise, a greater portion of incident energy is delayed.

The echoed Lamb waves 7 exhibits typically a time duration comprised between 0.2 millisecond and 1 millisecond, often between 0.3 millisecond and 0.5 millisecond. Time distribution of energy within this total duration depends on the load P applied to the scale.

Advantageously, a differential technique is used to assess the weight. The received echoed Lamb waves 7 under load P is compared with regard to a reference echoed Lamb waves at rest. Practically, the reference echoed Lamb waves timechart at rest is substracted from the echoed Lamb waves timechart under load, this difference is called "differentiated wave profile".

The reference echoed Lamb waves timechart at rest can be determined once and for all at assembly factory; it can be considered as an all-time tare reference.

According to one option, this reference can be updated along the life of the scale. For instance, a recent tare configuration is established (with no load applied on the scale) (FIG. 7A); then another measurement with the weight P applied is carried out (FIG. 7B). After that, the control unit 3 calculates the difference between the echoed Lamb waves 7 under weight and the echoed Lamb waves 7 of the tare configuration (FIG. 7C), which results in the so-called "differentiated wave profile".

The subsequent analysis of the "differentiated wave profile" (namely the difference signal) leads to a weight calculation.

As shown at FIGS. 7A,7B,7C, which illustrates a real case, the loaded echoed signal and the no-load echoed signal do not look very different, with voltage magnitudes between tenth of millivolts and hundreds of millivolts.

The order of magnitude of the difference (FIG. 7C) is much smaller; however it proves to be enough for a in-depth and accurate temporal and energetic analysis.

It is not excluded to have a complementary spectral analysis by FFT technique.

Back to the temporal analysis, it should be noted that the late part of the difference signal has the most significance versus the weight applied.

A simple analytical calculation on peak areas (position and magnitude of each of them) can lead to a weight calculation.

However, there may be proposed additionally a calibration/learning phase, which is carried out on the specific individual unit of interest. This calibration phase can be done at the manufacturing facility, just before packing and delivery.

A set of calibrated weights is applied one after the other onto the scale; and calibration parameters can be adjusted therefrom.

A typical set of calibrated weights is 30 kg, 40 kg, 50 kg, 60 kg, 70 kg, 80 kg, 90 kg, 100 kg, 110 kg, 120 kg, 130 kg, 140 kg, 150 kg.

A reduced set of calibrated weights can be 50 kg, 70 kg, 90 kg, 110 kg, 130 kg.

Although the illustrated example shows nine spacer pads, the number of spacer pads can be the different; among particular configurations, there can be provided four spacer pads, sixteen spacer pads, or other number at.

As illustrated on FIG. 8, in a variant configuration, there are provided two reception transducers 13,14. One is located at the left side, and the other one is located at the right side. Therefore, by comparing the echoed Lamb waves 7 received respectively at the left reception transducer 13 and at the right reception transducer 14, the control unit 3 is configured to detect the left-right off-centre stance, and provide an indication on the display so that the user can correct his/her stance.

There may be provided more than two reception transducers, for example 3, 4 or more; in such case the detection of a front-rear off-centre stance is also possible. A full front-rear and left-right off-center indication can be given.

Also there may be provided more than one emission transducer, energized one after the other and/or at the same time.

Further, according to one particular aspect, the ultrasonic transducers 11,12,13,14 are reversible, they can act as emitter or receiver, only the electronic driving interface has to be switched. Therefore, several configurations can be carried out with only one hardware layout on the sensory plate.

Figure 5:
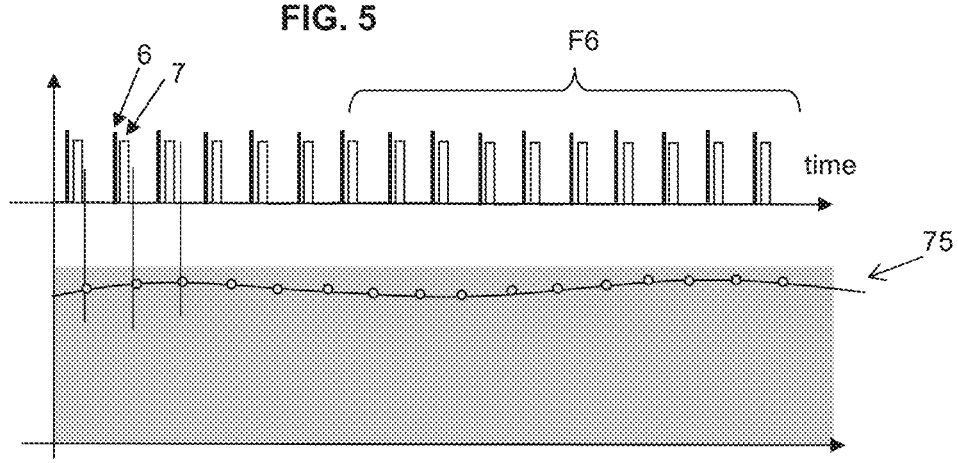
FIG. 5 is a diagrammatic timechart of the basic principle of operation, on a larger scale.
Figure 6:
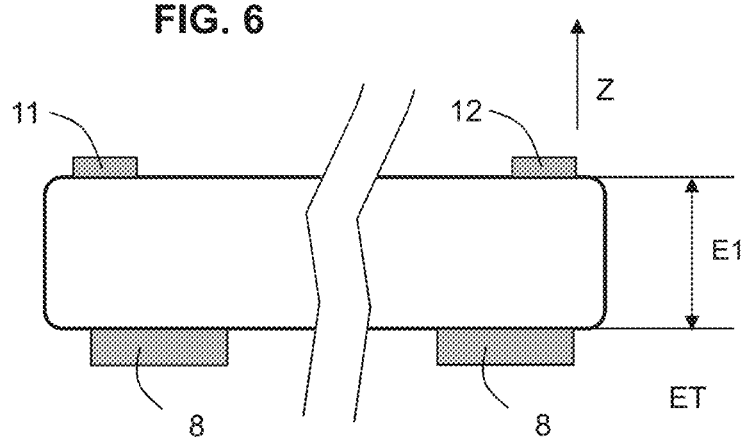
FIG. 6 shows an enlarged schematic elevation view of the device of FIG. 1.

Also, according to a particular aspect of the present disclosure, with reference to FIG. 5, the repetition of measurements alone to build a real-time curve 75, which reflects the evolution of the measured weight. The control unit is configured to analyse the definition of this real-time curve 75 by a technique called ballistography, known in the art, for example from document WO2014106716 of same applicant. The ballistography technique enables to carry out a measurement of heart rate, and possibly heart rate variability (HRV).

As illustrated on FIG. 9, in a variant configuration, there are provided only one transducer 11. The single transducer 11 is used sequentially in emission mode and then in reception mode. At the beginning of one measure, the piezoelectric transducer emits a burst 6 with a predefined duration e.g. about 10 µs; then the single transducer 11 is switched to reception mode; the single transducer 11 collects echoed signals; comparison and analysis follows through as explained before.

The single transducer 11 is then switched to emission mode again, ready for another measure cycle.

The invention claimed is:

1. A weighing device, configured to measure at least the weight of a person or an object, comprising:
   a control unit,
   a sensory plate,
   a top plate, arranged parallel and at distance from the sensory plate, with no direct contact with sensory plate,
   a plurality of spacer pads, interposed between the sensory plate and the top plate,
   isolator feet under the sensory plate,
wherein the sensory plate is fitted with at least an emission transducer configured to generate, on a periodic basis, a burst of Lamb waves at the surface of the sensory plate,
and wherein the sensory plate is fitted with at least a reception transducer, configured to receive echoed Lamb waves propagated through the sensory plate,
the temporal profile of the echoed Lamb waves being dependent on the weight applied to the top plate and passed by the spacer pads to the sensory plate,
wherein the control unit determines the weight applied to the top plate by analysis of the temporal profile of the echoed Lamb waves.

2. The weighing scale of claim 1, wherein the number of spacer pads is chosen between either 4 spacer pads, 9 spacer pads, or 16 spacer pads.

3. The weighing scale of claim 2, wherein each spacer exhibits a thickness of less than 2 mm.

4. The weighing scale of claim 1, wherein the thickness of the weighing scale is less than 18 mm.

5. The weighing scale of claim 1, wherein the top plate is rigid and is made of glass.

6. The weighing scale of claim 1, wherein the sensory plate is rigid and is made of glass.

7. The weighing scale of claim 1, wherein there is only one reception transducer.

8. The weighing scale of claim 1, wherein there are two or more emission transducers.

9. The weighing scale of claim 1, wherein there are two or more reception transducers.

10. The weighing scale of claim 9, further comprising a display and wherein the reception transducers are distributed on left side and right side, and an off-center condition is detected and indicated on the display.

11. The weighing scale of claim 1, wherein weight measures are performed repeatedly to output a successive series of weight values and a ballistography analysis is performed on the successive series of weight values.

12. The weighing scale of claim 1, wherein the generated burst of ultrasonic Lamb waves is comprised within the ultrasonic frequency range of [400 kHz-550 kHz].

13. The weighing scale of claim 1, wherein there is only one emission transducer and one reception transducer, the two latter formed by a single transducer used sequentially in emission mode and then in reception mode.

14. Method carried out in a weighing device comprising a control unit, a sensory plate fitted with at least a emission transducer and at least a reception transducer, a top plate, a plurality of spacer pads interposed between the sensory plate and the top plate, the method comprising the steps:
   c1—cause a person or objet to bear on the top plate,
   c2—generate emission of a Lamb waves burst at the emission transducer which causes Lamb waves to propagate through the sensory plate,
   c3—receive echoed Lamb waves at the reception transducer, and determine a first echoed Lamb waves profile,
   c4—compare the temporal profile of the first echoed Lamb waves, with regard to a base reference echoed Lamb waves profile, by difference calculation to obtain a differentiated wave profile,
   c5—determine therefrom the weight of the person or objet bearing on the top plate,
   display and/or send a resulting weight value.

15. The method of claim 14, further comprising the steps:
   a1—provide a tare configuration with no load on the scale,
   a2—generate emission of a Lamb waves burst at the emission transducer which causes Lamb waves to propagate through the sensory plate,
   a3—receive echoed Lamb waves at the reception transducer, and determine a reference tare echoed Lamb waves profile,
the base reference echoed Lamb waves profile is determined according to the reference tare echoed Lamb waves profile.

16. The method of claim 14, further comprising the steps:
   b1—cause a calibrated weight to lie on the top plate,
   b2—generate emission of a Lamb waves burst at the emission transducer which causes Lamb waves to propagate through the sensory plate,
   b3—receive echoed Lamb waves at the reception transducer, and determine a reference echoed Lamb waves profile,
   b4—compare the temporal profile of the echoed Lamb waves, with reference tare echoed Lamb waves profile,
   b5—determine a weight correction and/or allocate a set of parameters to be applied to subsequent weight measurement.

17. The method of claim 16, wherein a set of calibration weights is used to perform steps b1 to b5 several times in order to adjust individual calibration parameters.

18. The method of claim 14, wherein there are provided two or more reception transducers distributed on left side and right side, the method comprising the steps:
    detecting an off-center condition
    indicating an off-center condition on the display.

* * * * *